(12) United States Patent
Michna et al.

(10) Patent No.: US 10,838,907 B2
(45) Date of Patent: Nov. 17, 2020

(54) MATCHING DATA I/O TYPES ON BACKPLANE SYSTEMS

(71) Applicant: Hewlett Packard Enterprise Development LP, Houston, TX (US)

(72) Inventors: Vincent W. Michna, Houston, TX (US); Zheila N. Madanipour, Houston, TX (US); Patrick Raymond, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 16/080,570

(22) PCT Filed: Mar. 4, 2016

(86) PCT No.: PCT/US2016/020816
§ 371 (c)(1),
(2) Date: Aug. 28, 2018

(87) PCT Pub. No.: WO2017/151141
PCT Pub. Date: Sep. 8, 2017

(65) Prior Publication Data
US 2019/0179793 A1    Jun. 13, 2019

(51) Int. Cl.
*G06F 15/16* (2006.01)
*G06F 15/173* (2006.01)
(Continued)

(52) U.S. Cl.
CPC .... *G06F 15/17325* (2013.01); *G06F 13/4045* (2013.01); *G06F 15/161* (2013.01); *G06F 15/163* (2013.01); *G06F 15/17* (2013.01)

(58) Field of Classification Search
CPC .......... G06F 15/17325; G06F 13/4045; G06F 15/161; G06F 15/163; G06F 15/17
See application file for complete search history.

(56) References Cited

U.S. PATENT DOCUMENTS 4,937,785 A * 6/1990 Deering .................... G06T 1/20
710/306
7,719,995 B2   5/2010 Luft
(Continued)

FOREIGN PATENT DOCUMENTS

EP    2775652    9/2014

OTHER PUBLICATIONS

Cisco: Pass-through Technology; printed on Aug. 31, 2015 from: http://www.cisco.com/c/en/us/td/docs/solutions/Enterprise/Data_Center/DC_BladeServer/DCBladServ/BSrv_Ch3.html; 8 pages.
(Continued)

*Primary Examiner* — Viet D Vu
(74) *Attorney, Agent, or Firm* — Sheppard Mullin Richter & Hampton LLP

(57) ABSTRACT

Various examples described herein provide for determining a first data input/output (I/O) type of a computing device module and a second data I/O type of an I/O switch module, where the computing device module and the I/O switch module are coupled through a backplane system that includes a retimer. In response to the first data I/O type matching the second data I/O type, a connection between the computing device module and the I/O switch module may be permitted or prevented via the retimer.

20 Claims, 7 Drawing Sheets

(51) Int. Cl.
*G06F 15/17* (2006.01)
*G06F 15/163* (2006.01)
*G06F 13/40* (2006.01)

(56) References Cited

U.S. PATENT DOCUMENTS

| | | |
|---|---|---|
| 8,151,011 B2 | 4/2012 | Chiasson et al. |
| 8,713,295 B2 | 4/2014 | Bax et al. |
| 2004/0117526 A1 | 6/2004 | Benson et al. |
| 2004/0162928 A1 | 8/2004 | Benson |
| 2005/0094734 A1 | 5/2005 | Parthasarathy |
| 2014/0188996 A1 | 7/2014 | Lie et al. |
| 2014/0241411 A1* | 8/2014 | Ghiasi ............... H04L 25/4904 375/231 |
| 2016/0092381 A1* | 3/2016 | Chen ................. G06F 13/4286 710/104 |
| 2016/0098336 A1* | 4/2016 | Loebig ............... G06F 11/3051 710/16 |
| 2017/0017604 A1* | 1/2017 | Chen ................. G06F 11/3027 |

OTHER PUBLICATIONS

Griffin, B.; et al; "Dell Poweredge M1000e: Powerconnect M6220 Switch Stacking Use Case Guide"; Jan. 1, 2009; 13 pages.

IBM; "Advanced Management Module Messages Guide"; Oct. 2014; 340 pages.

Search Report and Written Opinion received for PCT Application No. PCT/US2016/020816, dated Dec. 2, 2016, 9 pages.

* cited by examiner

MATCHING DATA I/O TYPES ON BACKPLANE SYSTEMS

BACKGROUND

For certain server configurations, such as density-optimized server racks, input/output (I/O) switch units (e.g., high-speed I/O fabric switch) are traditionally utilized to facilitate communications between different computing device modules (e.g., server blades or cartridges). Generally, the I/O switch unit is installed at the top of the server rack. To meet customer demands for additional compute density within the server rack, the I/O switch may be integrated directly into a computer system enclosure of the server rack that receives the individual computing device modules. Space freed by this integration can be reallocated to additional computer system enclosures.

To integrate the I/O switch into a computer system enclosure, the computer system enclosure can include an active backplane that can provide an internal connection between a computing device module (e.g., a server blade or cartridge plugged into one side of the computer system enclosure) and a I/O switch disposed within the computer system enclosure (e.g., opposite to the server blade).

BRIEF DESCRIPTION OF THE DRAWINGS

Certain examples are described in the following detailed description in reference to the following drawings.

DETAILED DESCRIPTION

Figure 1:
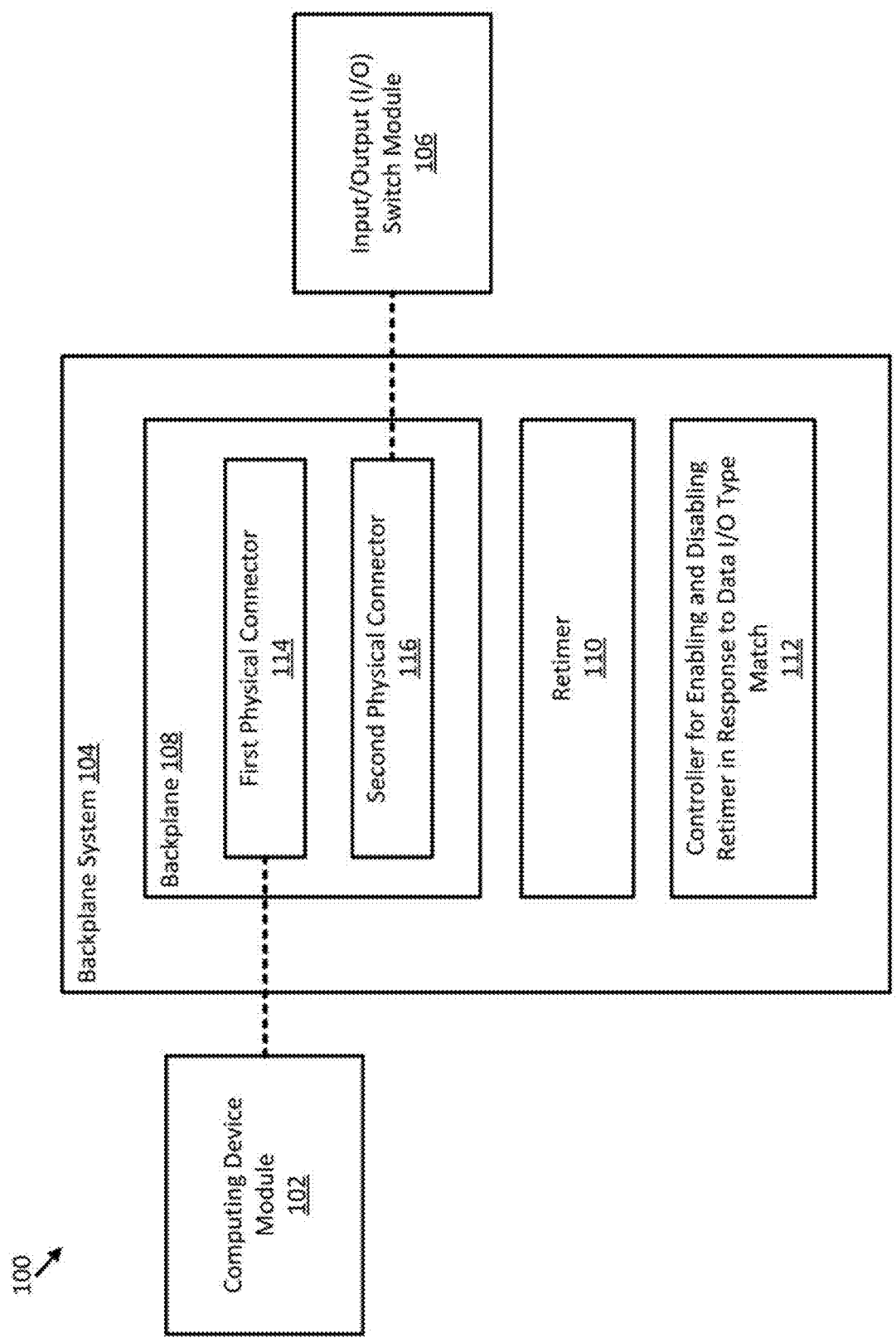
FIGS. 1 and 2 are block diagrams illustrating example computing environments including example backplane systems according to the present disclosure.

As noted, an active backplane in a computer system enclosure can permit integration of an I/O switch and can easily and simply permit an internal connection between a computing device module and an input/output (I/O) switch disposed within the computer system enclosure. Unfortunately, such an integration also makes it possible for an individual to connect a computing device module with one data I/O type (e.g., a first fabric type) through the backplane to an I/O switch module that supports a completely different data I/O type (e.g., a second fabric type). This mismatch in data I/O types can cause communication errors, or even worse, electrical damage to the switch module or the computing device module if nothing is done to disconnect the incompatible data I/O types.

Various examples described herein prevent a connection (through a backplane system) between a computing device module (e.g., server blade or cartridge) and an I/O switch module (e.g., Ethernet fabric switch) involving incompatible data I/O types. In particular, some examples prevent an incompatible connection between a computing device module and an I/O switch module when a data I/O type utilized by the computing device module does not match a data I/O type supported by the I/O switch module.

To achieve this, some examples described herein utilize a backplane system that includes a retimer to couple a computing device module with an I/O switch module. The backplane system may determine a first data input/output (I/O) type of a computing device module (e.g., supported by the computing device module) and may determine a second data I/O type of an I/O switch module (e.g., supported by the I/O switch module. In response to the first data I/O type matching the second data I/O type, the backplane system may permit or prevent a connection between the computing device module and the I/O switch module via the retimer.

As used herein, a retimer can include a signal retimer that can send or receive data signals (e.g., over a data bus) with respect to a hardware component (e.g., application-specific integrated circuit [ASIC]). Additionally, as used herein, modules and other components of various examples may comprise, in whole or in part, hardware (e.g., electronic circuitry), or a combination of hardware and programming (e.g., machine-readable instructions, such as firmware), to implement functionalities described herein. For instance, a module may comprise a combination of machine-readable instructions, stored on at least one non-transitory machine-readable storage medium, and at least one processing resource (e.g., controller) to execute those instructions. The machine-readable instructions may comprise computer-readable instructions executable by a processor to perform a set of functions in accordance with various examples described herein. In another instance, a module may comprise electronic circuitry to perform a set of functions in accordance with various examples described herein.

The following provides a detailed description of examples illustrated by FIGS. 1-7.

FIG. 1 is a block diagram illustrating an example computing environment 100 including an example backplane system 104 according to the present disclosure. As shown, the example computing environment 100 includes a computing device module 102, a backplane system 104, and an input/output (I/O) switch module 106. For various examples, the backplane system 104 is included within a computer system enclosure (e.g., chassis including a set of server trays), which may be capable of physically receiving the computing device module 102, the I/O switch module 106, or both. The computing device module 102 may physically couple to the backplane system 104 when the computing device module 102 is received by (e.g., inserted into) the computer system enclosure, and the I/O switch module 106 may physically couple to the backplane system 104 when the I/O switch module 106 received by (e.g., inserted into) the computer system enclosure. The backplane system 104 may be a component of a computer system, such a desktop, laptop, workstation, server (e.g., rack-mount server), or other device operated by a processor, and a computer system enclosure including the backplane system 104 may be part of such a computer system. For instance, the backplane system 104 may be part of a blade server computer system enclosure, where the computing device module 102 may comprise a blade server, and the I/O switch module 106 may comprise a I/O fabric switch. In various examples, the components or the arrangement of components in the backplane system 104 may differ from what is depicted in FIG. 1.

According to various examples, after each is coupled to the backplane system 104, the computing device module 102 and the I/O switch module 106 can exchange data through the backplane system 104. Depending on the example, the computing device module 102 can comprise a compute blade (e.g., server blade), compute cartridge (e.g., server cartridge), or another modular processor-based device that can be inserted (e.g., plugged) into a computer system enclosure (not shown) that includes the backplane system 104. For some examples, the computing device module 102 includes a physical connector (e.g., male or female media connector) that facilitates physically coupling with the backplane system 104. Through the backplane system 104, the computing device module 102 may communicate with the I/O switch module 106 using a number of data I/O types, including InfiniBand (e.g., EDR IB), INTEL Omni-Path, Ethernet, or the like, at different data rates (e.g., 100 Gb), which may be supported by the I/O switching module 106. For various examples, more than one computing device module can physically couple to the backplane system 104 and communicate with the I/O switch module 106, thereby facilitating data exchange (e.g., I/O data exchange) between the computing device modules (e.g., 102 and another computing device module) by way of the I/O switch module 106.

The I/O switch module 106 may comprise a data switch (e.g., network switch) capable exchanging data with two or more computing devices communicating with the I/O switch module 106. As noted herein, the computing device module 102 (and the like) can communicate with the I/O switch module 106 through the backplane system 104. To communicate with a computing device, the data switch may support a set of I/O data types including, but not limited to, InfiniBand (e.g., EDR IB), INTEL Omni-Path, Ethernet, and the like, at different data rates (e.g., 100 Gb), which may be supported by the I/O switching module 106. For instance, the I/O switch module 106 may comprise a 10 Gb Ethernet switch. Depending on the example, the backplane system 104 may couple to a plurality of I/O switch modules, which may support common or different I/O types. After coupling to the backplane system 104 within a computer system enclosure, the I/O switch module 106 can operate as an integrated I/O switch for various computing devices coupling to the backplane system 104.

In FIG. 1, the backplane system 104 comprises a backplane 108, a retimer 110, and a controller 112 for enabling and disabling the retimer 110 in response to a data I/O type match. Additionally, as shown, the backplane 108 includes a first physical connector 114 and a second physical connector 116. For some examples, the retimer 110, the controller 112, or both are included by the backplane 108 (e.g., disposed thereon). For instance, the retimer 110 may be disposed on the backplane 108, between the first physical connector 114 and the second physical connector 116, thereby permitting it to be included in the data signal path between the two connectors.

The backplane 108 may comprise a printed circuit board that includes a set of printed circuit board traces (e.g., data bus lanes) that physically couple the first physical connector 114 with the retimer 110, and a set of printed circuit board traces (e.g., data bus lanes) that that physically couple the second physical connector 116 with the retimer 110. For various examples, the first physical connector 114 is disposed on the backplane 108 such that the computing device module 102 can physically couple to the first physical connector 114 (e.g., at the back end of a server tray). Similarly, the second physical connector 116 is disposed on the backplane 108 such that the I/O switch module 106 can physically couple to the second physical connector 116 (e.g., side opposite a server tray). Additionally, for various examples, the retimer 110 is included as part of the backplane 108 (e.g., disposed on the backplane 108). The first physical connector 110 may comprise a first media connector (e.g., male or female connector) that permits the computing device module 102 to communicatively couple to the backplane 108. Accordingly, the first physical connector 114 may correspond to a physical connector included by the computing device module 102. Likewise, the second physical connector 116 may comprise a second media connector (e.g., male or female connector) that permits the I/O switch module 106 to communicatively couple to the backplane 108. As such, the second physical connector 116 may correspond to a physical connector included by the I/O switch module 106.

The retimer 110 may couple the first physical connector 114 with the second physical connector 116. For instance, the retimer 110 may comprise a 25 Gbps fabric retimer. Through this coupling, the retimer 110 can permit exchange of data between a computing device module (e.g., 102) coupled to the first physical connector 114 and an I/O switch module (e.g., 106) coupled to the second physical connector 116. Depending on the example, the retimer 110 may comprise a retimer capable of supporting a single data I/O type or may comprise an agnostic retimer capable of supporting a plurality of data I/O types. Examples of data I/O types supported by the retimer 110 can include, without limitation, InfiniBand (e.g., EDR IB), INTEL Omni-Path, Ethernet, and the like. The retimer 110 may include a transmitter and a receiver, which facilitates exchange data between the first physical connector 114 and the second physical connector 116.

The controller 112 may comprise a microcontroller that includes logic (e.g., machine instructions) or circuitry that causes it to perform operations as described herein. The controller 112 may be one included by a computer system enclosure that includes the backplane system 104 and, further, may be one disposed on the backplane 108. The controller 112 may disable the retimer 110 when the backplane system 104 transitions from a power off state to a power on state (e.g., initially powers-up). Alternatively, the retimer 110 may automatically disable itself when the backplane system 104 transitions from a power off state to a power on state when a computer device module is initially physically coupled to the second physical connector 114 (e.g., the computer device module 102 is replaced with another), or when a I/O switch module is initially coupled to the second physical connector 116 (e.g., the I/O switch module 106 is replaced with another). With the retimer 110 disabled, the backplane system 104 can prevent a connection through the backplane 108 between the computing device module 102 and the I/O switch module 106. This connection can be prevented until the backplane system 104 determines that the connection would involve compatible data I/O types (e.g., there is a fabric match between the computing device module 102 and the I/O switch module 106). For some examples, the retimer 110 couples the first physical connector 114 to the second physical connector 116 such that disabling the retimer 110 prevents a connection (e.g., data communication) between the computing device module 102 and the I/O switch module 106 without preventing similar connections between the second physical connector 116 and other physical connectors coupled to computing device modules.

The controller 112 may determine a first data I/O type of (e.g., supported by) the computing device module 102 physically coupled to the first physical connector 114. The controller 112 may determine a second data I/O type of (e.g., supported by) the I/O switch module 106 physically coupled to the second physically connector 116. For some examples, the controller 112 determines the first data I/O type by reading a read-only memory (ROM, such as EEPROM) included by the computing device module 102; the controller 112 may do so when the computing device module 102 transitions from a power off state to a power on state (e.g., when it is physically coupled to the backplane system 104). Similarly, for some examples, the controller 112 determines the second data I/O type by reading ROM included by the I/O switch module 106, and may do so when the I/O switch module 106 transitions from a power off state to a power on state (e.g., when it is physically coupled to the backplane system 104).

The controller 112 may compare the first determined data I/O type to the second determined data I/O type. In response to the first data I/O type matching the second data I/O type, the controller 112 may enable the retimer. With the retimer 110 enabled, the backplane system 104 can permit a connection through the backplane 108 between the computing device module 102 and the I/O switch module 106, thereby permitting communication of data between the computing device module 102 and the I/O switch module 106.

Figure 2:
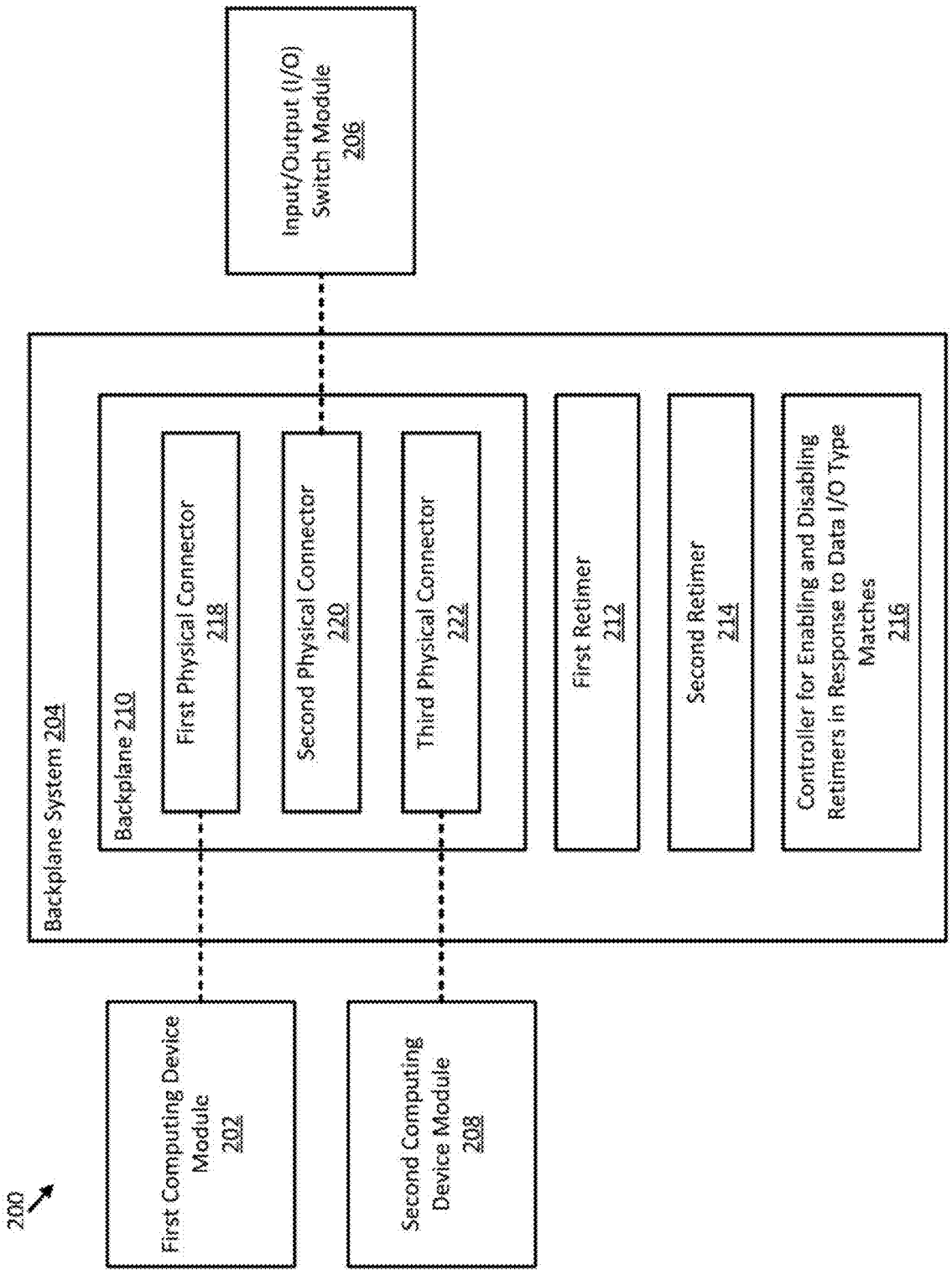

For some examples, the backplane system 104 can include an additional physical connector (e.g., third physical connector) and an additional retimer (e.g., second retimer) that couples the additional physical connector with the second physical connector 116. When an additional computing device module (e.g., second computing device module) is physically coupled to the additional physical connector, the additional computing device module and the computing device module 102 physically coupled to the first physical connector 114 can exchange data through the I/O switch module 106 physically coupled to the second physical connector 116. FIG. 2 illustrates such an example computing environment.

FIG. 2 is a block diagram illustrating an example computing environment 200 including an example backplane system 204 according to the present disclosure. As shown, the example computing environment 200 includes a first computing device module 202, a backplane system 204, an input/output (I/O) switch module 206, and a second computing device module 208. The backplane system 204 includes a backplane 210, and a first retimer 212, a second retimer 214, and a controller 216 for enabling and disabling the retimers (e.g., 212, 214) in response to data I/O type matches. The backplane 210 includes a first physical connector 218, a second physical connector 220, and a third physical connector 222. For some examples, the first retimer 212, the second retimer 214, the controller 216, or some combination thereof, are included by the backplane 210 (e.g., disposed thereon). For instance, the first retimer 212 may be disposed on the backplane 210 between the first physical connector 218 and the second physical connector 220, and the second retimer 215 may be disposed on the backplane 210 between the third physical connector 222 and the second physical connector 220.

According to some examples, the first computing device module 202 and the second computing device module 208 are similar to the computing device module 102 described herein with respect to FIG. 1, and the I/O switch module 206 is similar to the I/O switch module 106 described herein with respect to FIG. 1. For some examples, the first physical connector 218 and the third physical connectors 222 are similar to the first physical connector 114 described herein with respect to FIG. 1, and the second physical connector 220 is similar to the second physical connector 116 described herein with respect to FIG. 1. Additionally, with respect to the first computing device module 202, the first physical connector 218, the second physical connector 220, and the first retimer 212, the controller 216 operates similar to how the controller 112 is described as operating in FIG. 1 with respect to the computing device module 102, the first physical connector 114, the second physical connector 116, and the retimer 110.

Unlike FIG. 1, the backplane 210 of FIG. 2 includes the third physical connector 222, and the second retimer 214 that couples the third physical connector 222 to the second physical connector 220. For some examples, the first and second physical connectors 218, 220 are part of a plurality of physical connectors included by the backplane 210 that permit multiple computing device modules to physically couple to the backplane 210. As with the first physical connector 218 and the second retimer 214, the controller 216 may disable the second retimer 214 when the backplane system 210 transitions from a power off state to a power on state (e.g., initially powers-up). Alternatively, the second retimer 214 may automatically disable itself when the backplane system 210 transitions from a power off state to a power on state, when a computer device module is initially physically coupled to the third physical connector 222 (e.g., the second computing device module 208 is replaced with another), or when a I/O switch module is initially coupled to the second physical connector 220 (e.g., when the I/O switch module 206 is replaced with another).

With the second retimer 214 disabled, the backplane system 204 can prevent a connection through the backplane 210 between the second computing device module 208 and the I/O switch module 206. As described herein, this connection can be prevented until the backplane system 204 determines that the connection would involve compatible data I/O types (e.g., there is a fabric match between the second computing device module 208 and the I/O switch module 206). For some examples, the second retimer 214 couples the third physical connector 222 to the second physical connector 220 such that disabling the second retimer 214 prevents a connection (e.g., data communication) between the second computing device module 208 and the I/O switch module 206 without preventing similar connections between the second physical connector 116 and other physical connectors coupled to computing device modules.

Figure 3:
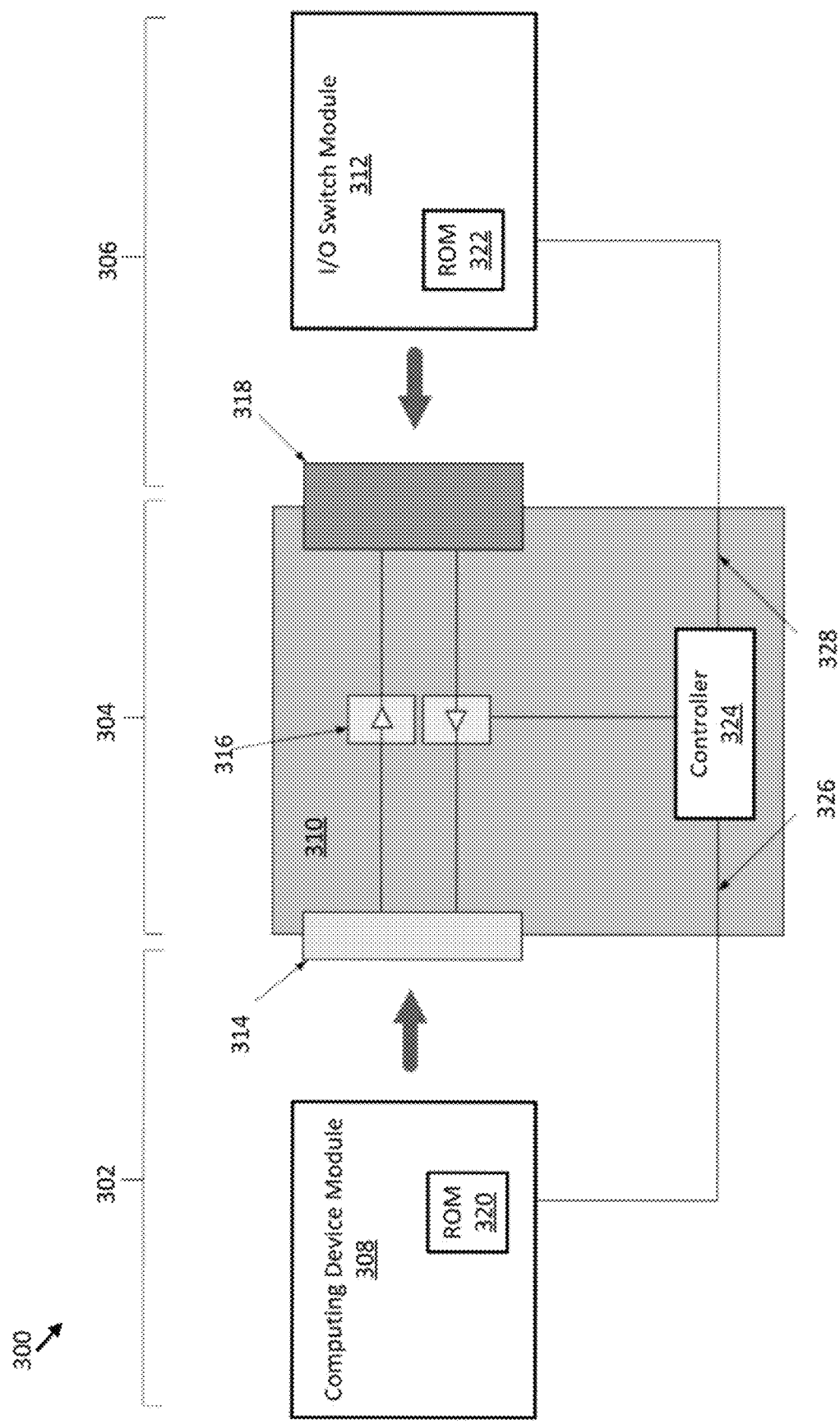
FIG. 3 is a block diagram illustrating an example computer system enclosure including an example backplane system according to the present disclosure.

FIG. 3 is a block diagram illustrating an example computer system enclosure 300 including an example backplane system 304 according to the present disclosure. For some examples, the backplane system 304 is similar to the backplane system 104 described with respect to FIG. 1. In FIG. 3, the computer system enclosure 300 includes a front portion 302 of the computer system enclosure 300, a rear portion 306 of the computer system enclosure 300, and the backplane system 304. As shown, the front portion 302 (e.g., cold aisle) of the computer system enclosure 300 can receive a computing device module 308, such as a compute tray, and the rear portion 306 (e.g., hot aisle) of the computer system enclosure 300 can receive an I/O switch module 312, such as a fabric I/O switch. The computing device module 308 comprises read-only memory 320 (e.g., EEPROM), which can store information regarding the computing device module 308, including a set of data I/O types supported by the computing device module 308. Likewise, the I/O switch module 312 comprises read-only memory 322 (e.g., EEPROM), which can store information regarding the computing device module 308, including a set of data I/O types supported by the computing device module 308.

The backplane system 304 includes a backplane 310, a computing device backplane connector 314 disposed on the backplane 310 and configured to receive a corresponding connector of the compute device module 308, and a switch backplane connector 318 disposed on the backplane 310 and configured to receive a corresponding connector of the I/O switch module 312. The backplane 310 includes a controller 324, and a retimer 316 (e.g., data I/O type agnostic retimer) coupled to each of the computing device backplane connector 314, the switch backplane connector 318, and the controller 324 (e.g., by printed circuit board traces disposed on the backplane 310). The controller 324 may comprise a microcontroller of the computer system enclosure 300.

According to various examples, the controller 324 automatically disables the retimer 316 when the backplane 310 powers up (e.g., the computer system enclosure 300 powers up). With the retimer 316 disabled, the computing device module 308 may be prevented from exchanging data with the I/O switch module 312 through the retimer 316. The controller 324 can determine a first data I/O data type supported by the computing device module 308, and can do so by reading (326) the ROM 320 of the computing device module 308. The controller 324 may read the ROM 320 through the computing device backplane connector 314, or another connector (now shown). Similarly, the controller 324 can determine a second data I/O data type supported by the I/O switch module 312, and can do so by reading (328) the ROM 322 of the I/O switch module 312. The controller 324 may read the ROM 322 through the switch backplane connector 318, or another connector (now shown). The controller 324 can verify whether the first data I/O data type matches the second data I/O type. If they do match, the controller 324 can enable the retimer 316, thereby permitting the computing device module 308 exchange data with the I/O switch module 312 through the retimer 316. If they do not match, the controller 324 may set a register bit (e.g., stored within the controller 324) to indicate that a data I/O mismatch has been detected. This register bit can be read by firmware or software operating on the computer system enclosure 300 (e.g., baseboard management controller or server management software), which in turn can report the error to a user (e.g., server administrator).

Figure 4:
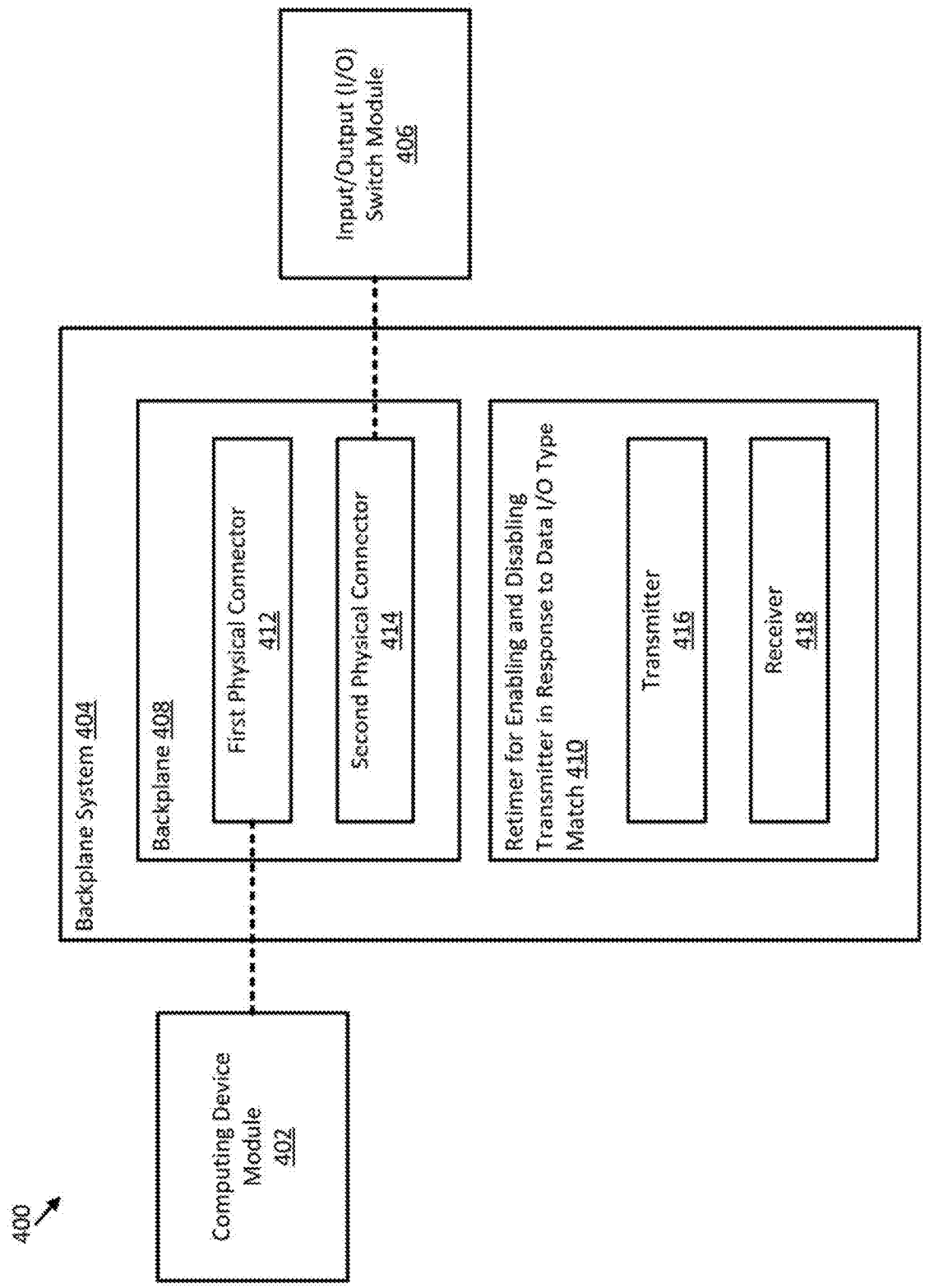
FIG. 4 is a block diagram illustrating an example computing environment including an example backplane system according to the present disclosure.

FIG. 4 is a block diagram illustrating an example computing environment 400 including an example backplane system 404 according to the present disclosure. As shown, the example computing environment 400 includes a computing device module 402, a backplane system 404, and an input/output (I/O) switch module 406. As also shown, the backplane system 404, includes a backplane 408, and a retimer 410 for enabling and disabling a transmitter of the retimer 410 in response to a data I/O type match. According to some examples, the computing device module 402, the I/O switch module 406, the backplane 408, the first physical connector 412, and the second physical connector 414 are respectively similar to the computing device module 102, the I/O switch module 106, the backplane 108, the first physical connector 114, and the second physical connector 116 described herein with respect to FIG. 1. In various examples, the components or the arrangement of components in the backplane system 404 may differ from what is depicted in FIG. 4.

Similar to the backplane system 104 of FIG. 1, the backplane system 404 may be included within a computer system enclosure (not shown), which may be capable of physically receiving the computing device module 402, the I/O switch module 406, or both. The computing device module 402 may physically couple to the backplane system 404 when the computing device module 402 is received by (e.g., inserted into) the computer system enclosure, and the I/O switch module 406 may physically couple to the backplane system 404 when the I/O switch module 406 received by (e.g., inserted into) the computer system enclosure. The backplane system 404 may be a component of a computer system, such a desktop, laptop, workstation, server (e.g., rack-mount server), or other device operates by a processor, and a computer system enclosure including the backplane system 404 may be part of such a computer system.

In FIG. 4, the retimer 410 includes a transmitter 416 and a receiver 418. According to some examples, the transmitter 416 is disabled and the receiver 418 is enabled (or leaving it enabled if it is already enabled) when the retimer 410 transitions from a power off state to a power on state. During operation, the retimer 410 may determine, by the receiver 418, a first data I/O type of the computing device module 402. For some examples, while the transmitter 416 is disabled and the receiver 418 is enabled, the receiver 418 (e.g., input physical [PHY] layer) detects the first data I/O type from a protocol training or linking sequence (e.g., to adjust to channel, negotiate speed, or negotiate number of lanes to be used by the computing device module 402 to communicate with the I/O switch module 406) performed by the computing device module 402. The protocol training or linking sequence of the computing device module 402 may be performed when the backplane system 404 transitions from a power off state to a power on state, or when the computing device module 402 is physically coupled to the first physical connector 412 (e.g., plugged into the backplane system 404).

The retimer 410 may determine, by the receiver 418, a second data I/O type of the I/O switch module 406. For some examples, while the transmitter 416 is disabled and the receiver 418 is enabled, the receiver 418 (e.g., input physical [PHY] layer) detects the second data I/O type from a protocol training or linking sequence (e.g., to adjust to channel, negotiate speed, or negotiate number of lanes to be used by the I/O switch module 406 to communicate with the computing device module 402) performed by the I/O switch module 406. The protocol training or linking sequence of the I/O switch module 406 may be performed when the backplane system 404 transitions from a power off state to a power on state, or when the I/O switch module 406 is physically coupled to the second physical connector 414 (e.g., plugged into the backplane system 404).

In response to the first data I/O type matching the second data I/O type, the retimer 410 may enable the transmitter 416. Alternatively, in response to the first data I/O type mismatching the second data I/O type, the transmitter 416 may remain disabled and, additionally, may set an error indicator readable by a controller of the backplane system 404.

Figure 5:
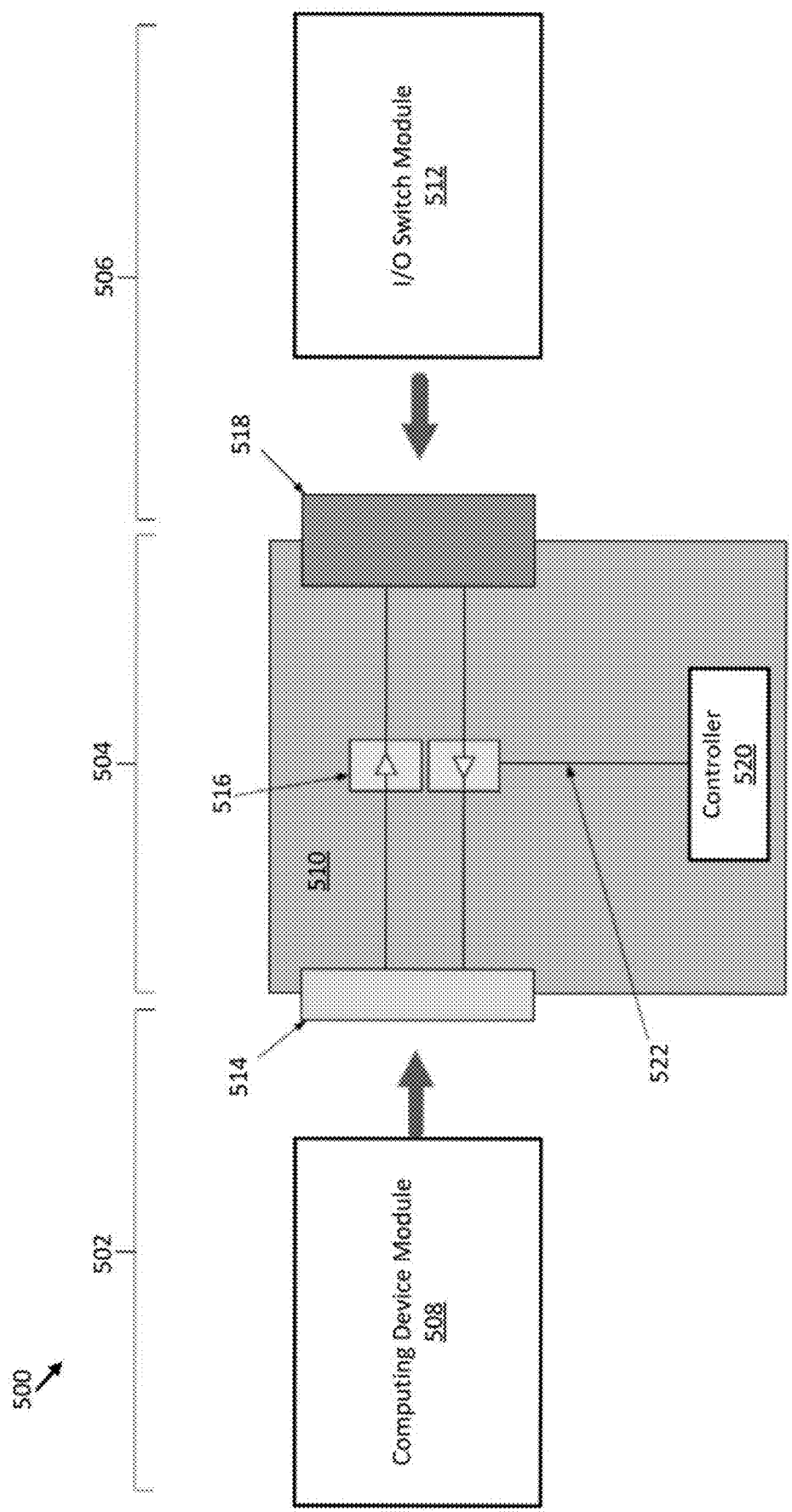
FIG. 5 is a block diagram illustrating an example computer system enclosure including an example backplane system according to the present disclosure.

FIG. 5 is a block diagram illustrating an example computer system enclosure 500 including an example backplane system 504 according to the present disclosure. For some examples, the backplane system 504 is similar to the backplane system 404 described with respect to FIG. 4. In FIG. 5, the computer system enclosure 500 includes a front portion 502 of the computer system enclosure 500, a rear portion 506 of the computer system enclosure 500, and the backplane system 504. As shown, the front portion 502 (e.g., cold aisle) of the computer system enclosure 500 can receive a computing device module 508, such as a compute tray, and the rear portion 506 (e.g., hot aisle) of the computer system enclosure 500 can receive an I/O switch module 512, such as a fabric I/O switch.

The backplane system 504 includes a backplane 510, a computing device backplane connector 514 disposed on the backplane 510 and configured to receive a corresponding connector of the compute device module 508, and a switch backplane connector 518 disposed on the backplane 510 and configured to receive a corresponding connector of the I/O switch module 512. The backplane 510 includes a controller 520, and a retimer 516 (e.g., data I/O type agnostic retimer) coupled to each of the computing device backplane connector 514, the switch backplane connector 518, and the controller 520 (e.g., by printed circuit board traces disposed on the backplane 510). The controller 520 may comprise a microcontroller of the computer system enclosure 500.

According to various examples, the retimer 516 automatically disables its transmitter when the backplane 510 powers up (e.g., the computer system enclosure 500 powers up) or when the retimer 516 powers up. Alternatively, the retimer 516 may disable its transmitter when the computing device module 508 is physically coupled to the backplane system 504 or when the I/O switch module 512 is physically coupled to the backplane system 504. The receiver of the retimer 516 can detect the first data I/O type of the computing device module 508 during a protocol training or linking sequence performed by the computing device module 508 (e.g., when the computing device module 508 is physically coupled to the backplane system 504). The receiver of the retimer 516 can detect the second data I/O type of the I/O switch module 512 during a protocol training or linking sequence performed by the I/O switch module 512 (e.g., when the I/O switch module 512 is physically coupled to the backplane system 504). In response to the first data I/O type matching the second data I/O type, the retimer 516 may enable the transmitter of the retimer 516. In response to the first data I/O type mismatching the second data I/O type, the transmitter of the retimer 516 can remain disabled. Additionally, in response to the first data I/O type mismatching the second data I/O type, the retimer 516 can send an error indicator (522) to the controller 520.

Figure 6:
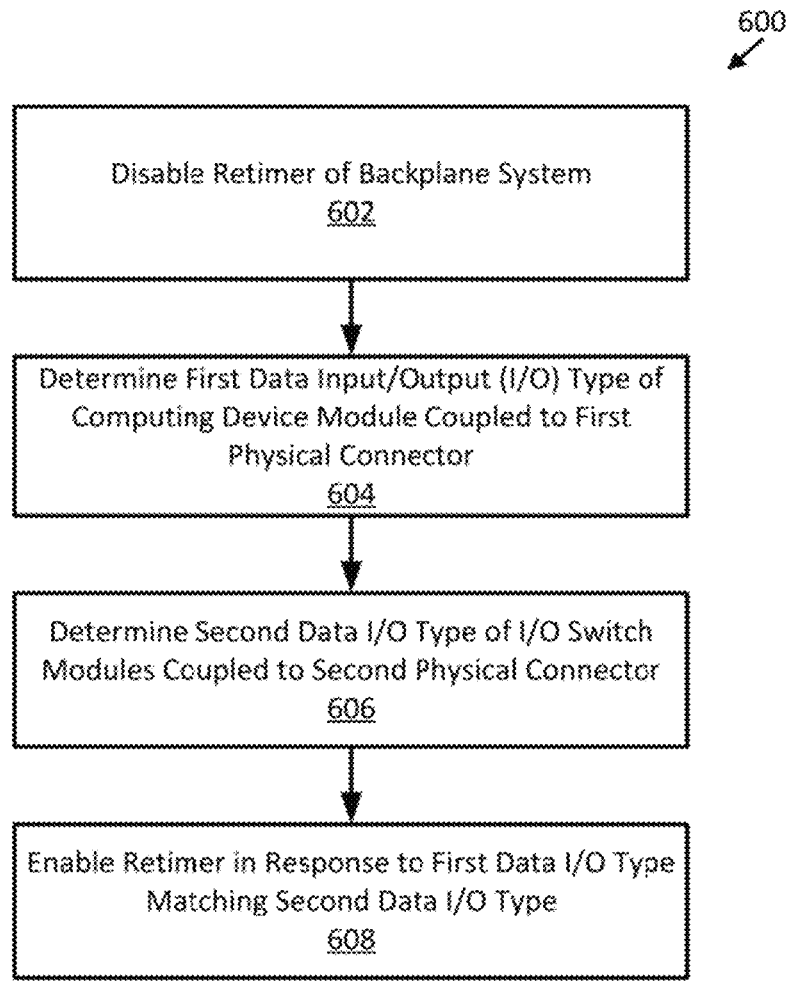
FIGS. 6 and 7 flow diagrams illustrating example methods for backplane systems according to the present disclosure.

FIG. 6 is a flow diagram illustrating an example method 600 for a backplane system according to the present disclosure. In particular, the method 600 may be performed a controller with respect to a backplane system, such as the backplane system 104 of FIG. 1 or the backplane system 204 of FIG. 2, or the backplane system 404 of FIG. 4. Although execution of the method 600 is described below with reference to the backplane system 104 of FIG. 1 and the backplane system 404 of FIG. 4, execution of the method 600 by other suitable systems or devices may be possible. The method 600 may be implemented in the form of executable instructions stored on a computer-readable medium or in the form of electronic circuitry.

In FIG. 6, the method 600 may begin at block 602, with disablement of a retimer of a backplane system. For some examples, disabling the retimer of the backplane system comprises a controller of the backplane system disabled the retimer. For instance, with respect the backplane system 104, the controller 112 may disable the retimer 110 of the backplane system 104, and may do so when the backplane system 104 transitions to a power on state (e.g., from a power off state). The backplane system 104 may transition to a power on state when a computer system enclosure including the backplane system is powered on.

For some examples, disabling the retimer of the backplane system comprises disabling a transmitter included by the retimer while enabling a receiver of the retimer, thereby permitting the retimer to determine first data I/O type and determining the second data I/O type by the receiver. For instance, with respect to the backplane system 404, disabling the retimer 410 comprise the retimer 410 disabling the transmitter 416 of the retimer 410 while enabling the receiver 418 of the retimer 410 (or leaving it enabled if it is already enabled).

The method 600 may continue to block 604, with a determination of a first data I/O type of a computing device module coupled to a first physical connector. The method 600 may continue to block 606, with a determination of a second data I/O type of an I/O switch module coupled to a second physical connector. For some examples, the first data I/O type, the second data I/O type, or both is determined by a retimer of a backplane system. For instance, the receiver 418 of the retimer 410 may determine the first data I/O type, the second data I/O type, or both. The receiver 418 may determine the first data I/O type by detecting a training sequence performed by the computing device module 402, and may determine the second data I/O type by detecting a training sequence (e.g., PCI Express training sequence) performed by the I/O switch module 406.

For some examples, the first data I/O type, the second data I/O type, or both is determined by a controller of a backplane system. For instance, the controller 112 may determine the first data I/O type by reading a ROM (e.g., EEPROM) of the computer device module 102, and may determine may determine the second data I/O type by reading a ROM (e.g., EEPROM) of the I/O switch module 106.

The method 600 may continue to block 608, with enablement of the retimer in response to the first data I/O type matching the second data I/O type.

For some examples, enabling the retimer of the backplane system comprises a controller of the backplane system enabling the retimer. For instance, the controller 112 can enable the retimer 110 in response to the first data I/O type matching the second data I/O type.

For some examples, enabling the retimer of the backplane system comprises the retimer of the backplane system enabling a transmitter of the retimer. For instance, the retimer 410 can enable the transmitter 416 of the retimer 410 in response to the first data I/O type matching the second data I/O type.

Figure 7:
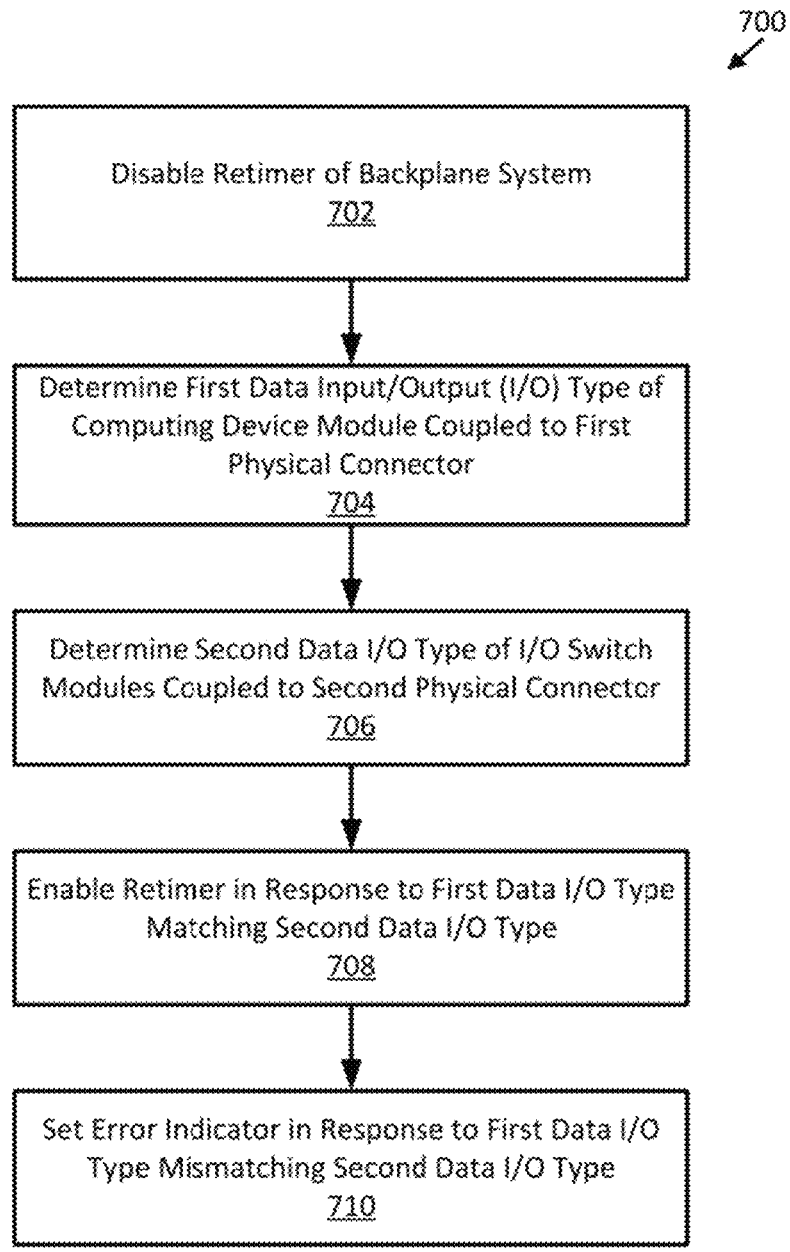

FIG. 7 is a flow diagram illustrating an example method 700 for a backplane system according to the present disclosure. In particular, the method 700 may be performed a controller with respect to a backplane system, such as the backplane system 104 of FIG. 1 or the backplane system 204 of FIG. 2, or the backplane system 404 of FIG. 4. Although execution of the method 700 is described below with reference to the backplane system 104 of FIG. 1 and the backplane system 404 of FIG. 4, execution of the method 700 by other suitable systems or devices may be possible. The method 700 may be implemented in the form of executable instructions stored on a computer-readable medium or in the form of electronic circuitry.

In FIG. 7, the method 700 may begin at block 702 and may continue to blocks 704, 706, and 708, which may be respectively similar to blocks 602, 604, 606, and 608 of the method 600 as described above with respect to FIG. 6. The method 700 may continue to block 710, with setting of an error indicator in response to the first data I/O type mismatching the second data I/O type. For some examples, the error indicator is one readable by a controller of a computer system enclosure or, more specifically, a backplane included by the computer system enclosure. Depending on the example, setting the error indicator may comprise setting an error bit stored in memory or a controller (e.g., register of the controller 112). Alternatively, setting an error indicator may comprise transmitting an error signal to another component that sets (e.g., stores) the error indicator in response to the error signal.

For instance, when the first data I/O type mismatches the second data I/O type, the retimer 410 may send an error indicator to a controller (e.g., of a backplane system or a computer system enclosure including the backplane system). When the first data I/O type mismatches the second data I/O type, the retimer 410 may maintain the transmitter 416 of the retimer 410 as disabled.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A backplane system, comprising:
a backplane including a first physical connector to couple with a computing device module, and a second physical connector to couple with an input/output (I/O) switch module;
a retimer coupling the first physical connector with the second physical connector; and
a controller coupled with the retimer, wherein the controller is to:
disable a transmitter and enable a receiver of the retimer when the backplane system transitions from a power off state to a power on state;
determine a first data I/O type of the computing device module;
determine a second data I/O type of the I/O switch module; and
in response to the first data I/O type matching the second data I/O type, enable the transmitter of the retimer, wherein the transmitter remains disabled when the first data I/O type does not match the second data I/O type.

2. The backplane system of claim 1, wherein the controller is to determine the first data I/O type of the computing device module by reading a read-only memory (ROM) of the computing device module.

3. The backplane system of claim 1, wherein the controller is to determine the second data I/O type of the computing device module by reading a read-only memory (ROM) of the I/O switch.

4. The backplane system of claim 1, wherein the retimer is capable of supporting a plurality of data I/O types.

5. The backplane system of claim 1, the backplane including a third physical connector to couple with a second computing device module, the backplane system comprising a second retimer coupling the third physical connector with the second physical connector, the controller coupled with the second retimer, wherein the controller is to:
disable the second retimer when the backplane system transitions from a power off state to a power on state;
determine a third data I/O type of the second computing device module; and
in response to the third data I/O type matching the second data I/O type, enable the second retimer.

6. A backplane system, comprising:
a backplane including a first physical connector to couple with a computing device module, and a second physical connector to couple with an input/output (I/O) switch module;
a retimer coupling the first physical connector with the second physical connector, the retimer including a transmitter and a receiver, the transmitter being disabled and the receiver being enabled when the retimer transitions from a power off state to a power on state, wherein the retimer is to:
determine, by the receiver, a first data I/O type of the computing device module;
determine, by the receiver, a second data I/O type of the I/O switch module; and
in response to the first data I/O type matching the second data I/O type, enable the transmitter, wherein the transmitter remains disabled when the first data I/O type does not match the second data I/O type.

7. The backplane system of claim 6, wherein in response to the first data I/O type mismatching the second data I/O type, the retimer is to set an error indicator readable by a controller of the backplane system.

8. The backplane system of claim 6, wherein the retimer determines the first data I/O type by detecting a training sequence performed by the computing device module.

9. The backplane system of claim 6, wherein the retimer determines the second data I/O type by detecting a training sequence performed by the I/O switch module.

10. A method, comprising:
disabling a transmitter and enable a receiver of a retimer of a backplane system, the retimer coupling a first physical connector of the backplane system to a second physical connector of the backplane system;
determining a first data input/output (I/O) type of a computing device module coupled with the first physical connector;
determining a second data I/O type of an I/O switch module coupled with the second physical connector; and
in response to the first data I/O type matching the second data I/O type, enabling the transmitter of the retimer, wherein the transmitter remains disabled when the first data I/O type does not match the second data I/O type.

11. The method of claim 10, wherein disabling the retimer of the backplane system comprises a controller of the backplane system disabling the retimer.

12. The method of claim 10, wherein determining the first data I/O type and determining the second data I/O type are determined by the receiver of the retimer.

13. The method of claim 10, comprising in response to the first data I/O type mismatching the second data I/O type, setting an error indicator readable by a controller of the backplane system.

14. The method of claim 10, wherein the first data I/O type and the second data I/O type are determined by the retimer.

15. The method of claim 10, wherein the first data I/O type and the second data I/O type are determined by a controller of the backplane system.

16. The backplane system of claim 1, wherein an entirety of the retimer is disabled when the transmitter and the receiver of the retimer are disabled.

17. The backplane system of claim 1, wherein the retimer is a first retimer, and the system further comprises a second retimer that disables itself.

18. The backplane system of claim 17, wherein the second retimer disables itself when the backplane system transitions from a power off state to a power on state.

19. The backplane system of claim 17, wherein the second retimer disables itself when the computing device module is initially physically coupled to a third physical connector and a second computing device module is replaced with another.

20. The backplane system of claim 17, wherein the second retimer disables itself when the I/O switch module is initially physically coupled to the second physical connector and the I/O switch module is replaced with another.

* * * * *